United States Patent
Williams et al.

(10) Patent No.: US 10,790,960 B2
(45) Date of Patent: *Sep. 29, 2020

(54) SECURE PROBABILISTIC ANALYTICS USING AN ENCRYPTED ANALYTICS MATRIX

(71) Applicant: Enveil, Inc., Fulton, MD (US)

(72) Inventors: Ellison Anne Williams, Fulton, MD (US); Ryan Carr, Fulton, MD (US)

(73) Assignee: Enveil, Inc., Fulton, MD (US)

( * ) Notice: Subject to any disclaimer, the term of this patent is extended or adjusted under 35 U.S.C. 154(b) by 209 days.

This patent is subject to a terminal disclaimer.

(21) Appl. No.: 15/876,068

(22) Filed: Jan. 19, 2018

(65) Prior Publication Data

US 2018/0212758 A1      Jul. 26, 2018

Related U.S. Application Data

(60) Provisional application No. 62/448,890, filed on Jan. 20, 2017, provisional application No. 62/448,918, (Continued)

(51) Int. Cl.
*H04L 9/00*     (2006.01)
*H04L 9/30*     (2006.01)
(Continued)

(52) U.S. Cl.
CPC ............ *H04L 9/008* (2013.01); *G06F 16/254* (2019.01); *G06F 16/3344* (2019.01);
(Continued)

(58) Field of Classification Search
CPC ..... H04L 9/008; H04L 9/0643; H04L 9/0861; H04L 9/14; H04L 9/30; H04L 9/302;
(Continued)

(56) References Cited

U.S. PATENT DOCUMENTS 5,732,390 A      3/1998   Katayanagi et al.
6,178,435 B1     1/2001   Schmookler
(Continued)

FOREIGN PATENT DOCUMENTS

EP     2873186 B1       3/2018
JP     5680007 B2 *     3/2015    ........... H04L 9/3073
(Continued)

OTHER PUBLICATIONS

"International Search Report" and "Written Opinion of the International Searching Authority," Patent Cooperation Treaty Application No. PCT/US2018/014535, dated Apr. 19, 2018, 9 pages.
(Continued)

*Primary Examiner* — Yonas A Bayou
(74) *Attorney, Agent, or Firm* — Carr & Ferrell LLP

(57) ABSTRACT

Provided are methods and systems for performing a secure probabilistic analytic using an encrypted analytics matrix. An example method includes acquiring, by a client, an analytic, analytic parameters associated with the analytic, and a homomorphic encryption scheme including a public key for encryption and a private key for decryption. The method further includes generating, using the encryption scheme, an analytic matrix based on the analytic and analytic parameters, and sending the analytic matrix and the encryption scheme to at least one server. The method includes generating, by the server and based on the encryption scheme, set of terms from a data set, evaluating the analytic matrix over the set of terms to obtain an encrypted result, and estimating a probabilistic error of the encrypted result. The method further includes sending, by the server, the encrypted result and the probabilistic error to the client where the encrypted result is decrypted.

20 Claims, 4 Drawing Sheets

Related U.S. Application Data filed on Jan. 20, 2017, provisional application No. 62/448,893, filed on Jan. 20, 2017, provisional application No. 62/448,906, filed on Jan. 20, 2017, provisional application No. 62/448,908, filed on Jan. 20, 2017, provisional application No. 62/448,913, filed on Jan. 20, 2017, provisional application No. 62/448,916, filed on Jan. 20, 2017, provisional application No. 62/448,883, filed on Jan. 20, 2017, provisional application No. 62/448,885, filed on Jan. 20, 2017, provisional application No. 62/448,902, filed on Jan. 20, 2017, provisional application No. 62/448,896, filed on Jan. 20, 2017, provisional application No. 62/448,899, filed on Jan. 20, 2017, provisional application No. 62/462,818, filed on Feb. 23, 2017.

(51) Int. Cl.

| | | |
|---|---|---|
| *H04L 9/08* | (2006.01) | |
| *H04L 9/06* | (2006.01) | |
| *G06F 17/16* | (2006.01) | |
| *G06F 16/33* | (2019.01) | |
| *G06F 21/62* | (2013.01) | |
| *G06F 16/25* | (2019.01) | |
| *H04L 9/32* | (2006.01) | |
| *G06F 40/30* | (2020.01) | |
| *H04L 9/14* | (2006.01) | |
| *H04L 29/06* | (2006.01) | |
| *G09C 1/00* | (2006.01) | |
| *G06F 40/211* | (2020.01) | |
| *G06F 40/253* | (2020.01) | |
| *G06F 40/284* | (2020.01) | |
| *G06F 40/295* | (2020.01) | |
| *G06N 3/04* | (2006.01) | |
| *G06N 3/08* | (2006.01) | |
| *G06N 7/08* | (2006.01) | |
| *G06F 21/30* | (2013.01) | |

(52) U.S. Cl.
CPC .......... *G06F 17/16* (2013.01); *G06F 21/6218* (2013.01); *G06F 40/30* (2020.01); *G09C 1/00* (2013.01); *H04L 9/0643* (2013.01); *H04L 9/0861* (2013.01); *H04L 9/14* (2013.01); *H04L 9/30* (2013.01); *H04L 9/302* (2013.01); *H04L 9/3242* (2013.01); *H04L 63/0435* (2013.01); *G06F 21/30* (2013.01); *G06F 40/211* (2020.01); *G06F 40/253* (2020.01); *G06F 40/284* (2020.01); *G06F 40/295* (2020.01); *G06N 3/04* (2013.01); *G06N 3/08* (2013.01); *G06N 7/08* (2013.01); *H04L 2209/04* (2013.01); *H04L 2209/12* (2013.01)

(58) Field of Classification Search
CPC ............... H04L 9/3242; H04L 63/0435; G06F 16/3344; G06F 16/254; G06F 17/16; G06F 17/2785; G06F 21/6218; G09C 1/00

See application file for complete search history.

(56) References Cited

U.S. PATENT DOCUMENTS

| | | |
|---|---|---|
| 6,745,220 B1 | 6/2004 | Hars |
| 6,748,412 B2 | 6/2004 | Ruehle |
| 6,910,059 B2 | 6/2005 | Lu et al. |
| 7,712,143 B2 | 5/2010 | Comlekoglu |
| 7,937,270 B2 * | 5/2011 | Smaragdis ............ G10L 15/30 |
| | | 380/28 |
| 8,515,058 B1 | 8/2013 | Gentry |
| 8,565,435 B2 | 10/2013 | Gentry et al. |
| 8,781,967 B2 | 7/2014 | Tehranchi et al. |
| 8,832,465 B2 | 9/2014 | Gulati et al. |
| 9,059,855 B2 | 6/2015 | Johnson et al. |
| 9,094,378 B1 | 7/2015 | Yung et al. |
| 9,189,411 B2 | 11/2015 | Mckeen et al. |
| 9,215,219 B1 | 12/2015 | Krendelev et al. |
| 9,288,039 B1 | 3/2016 | Monet et al. |
| 9,491,111 B1 | 11/2016 | Roth et al. |
| 9,503,432 B2 | 11/2016 | El Emam et al. |
| 9,514,317 B2 | 12/2016 | Martin et al. |
| 9,565,020 B1 | 2/2017 | Camenisch et al. |
| 9,577,829 B1 | 2/2017 | Roth et al. |
| 9,652,609 B2 | 5/2017 | Kang et al. |
| 9,846,787 B2 | 12/2017 | Johnson et al. |
| 9,852,306 B2 | 12/2017 | Cash et al. |
| 9,942,032 B1 | 4/2018 | Kornaropoulos et al. |
| 9,946,810 B1 * | 4/2018 | Trepetin ............. H04L 63/0428 |
| 9,973,334 B2 | 5/2018 | Hibshoosh et al. |
| 10,027,486 B2 | 7/2018 | Liu |
| 10,055,602 B2 | 8/2018 | Deshpande et al. |
| 10,073,981 B2 * | 9/2018 | Arasu ............... G06F 21/6218 |
| 10,075,288 B1 | 9/2018 | Khedr et al. |
| 10,129,028 B2 | 11/2018 | Kamakari et al. |
| 10,148,438 B2 | 12/2018 | Evancich et al. |
| 10,181,049 B1 | 1/2019 | El Defrawy et al. |
| 10,210,266 B2 * | 2/2019 | Antonopoulos ........ H04L 9/008 |
| 10,235,539 B2 | 3/2019 | Ito et al. |
| 10,255,454 B2 | 4/2019 | Kamara et al. |
| 10,333,715 B2 | 6/2019 | Chu et al. |
| 10,375,042 B2 | 8/2019 | Chaum |
| 10,396,984 B2 | 8/2019 | French et al. |
| 10,423,806 B2 | 9/2019 | Cerezo Sanchez |
| 10,489,604 B2 | 11/2019 | Yoshino et al. |
| 10,496,631 B2 | 12/2019 | Tschudin et al. |
| 10,644,876 B2 | 5/2020 | Williams et al. |
| 10,693,627 B2 | 6/2020 | Carr |
| 10,721,057 B2 | 7/2020 | Carr |
| 10,728,018 B2 | 7/2020 | Williams et al. |
| 2002/0032712 A1 | 3/2002 | Miyasaka et al. |
| 2002/0104002 A1 | 8/2002 | Nishizawa et al. |
| 2003/0037087 A1 | 2/2003 | Rarick |
| 2003/0059041 A1 | 3/2003 | MacKenzie et al. |
| 2004/0167952 A1 | 8/2004 | Gueron et al. |
| 2005/0008152 A1 | 1/2005 | MacKenzie |
| 2005/0076024 A1 | 4/2005 | Takatsuka et al. |
| 2005/0259817 A1 | 11/2005 | Ramzan et al. |
| 2006/0008080 A1 | 1/2006 | Higashi et al. |
| 2006/0008081 A1 | 1/2006 | Higashi et al. |
| 2007/0053507 A1 * | 3/2007 | Smaragdis ............ H04L 9/008 |
| | | 380/28 |
| 2007/0095909 A1 | 5/2007 | Chaum |
| 2007/0140479 A1 | 6/2007 | Wang et al. |
| 2007/0143280 A1 * | 6/2007 | Wang .................. G06F 21/6254 |
| 2009/0037504 A1 | 2/2009 | Hussain |
| 2009/0193033 A1 | 7/2009 | Ramzan et al. |
| 2009/0268908 A1 | 10/2009 | Bikel et al. |
| 2009/0279694 A1 | 11/2009 | Takahashi et al. |
| 2010/0202606 A1 | 8/2010 | Almeida |
| 2010/0205430 A1 | 8/2010 | Chiou et al. |
| 2011/0026781 A1 | 2/2011 | Osadchy et al. |
| 2011/0107105 A1 | 5/2011 | Hada |
| 2011/0110525 A1 | 5/2011 | Gentry |
| 2011/0243320 A1 | 10/2011 | Halevi et al. |
| 2011/0283099 A1 | 11/2011 | Nath et al. |
| 2012/0039469 A1 | 2/2012 | Meuller et al. |
| 2012/0054485 A1 | 3/2012 | Tanaka et al. |
| 2012/0066510 A1 | 3/2012 | Weinman |
| 2012/0201378 A1 | 8/2012 | Mabeel et al. |
| 2012/0265794 A1 | 10/2012 | Niel |
| 2012/0265797 A1 | 10/2012 | Niel |
| 2013/0010950 A1 | 1/2013 | Kerschbaum |
| 2013/0051551 A1 | 2/2013 | El Aimani |
| 2013/0054665 A1 | 2/2013 | Felch |
| 2013/0170640 A1 | 7/2013 | Gentry |
| 2013/0191650 A1 * | 7/2013 | Balakrishnan ........ H04L 9/008 |
| | | 713/190 |
| 2013/0195267 A1 | 8/2013 | Alessio et al. |

(56) References Cited

U.S. PATENT DOCUMENTS

| | | |
|---|---|---|
| 2013/0216044 A1 | 8/2013 | Gentry et al. |
| 2013/0230168 A1 | 9/2013 | Takenouchi |
| 2013/0246813 A1 | 9/2013 | Mori et al. |
| 2013/0326224 A1 | 12/2013 | Yavuz |
| 2013/0339722 A1 | 12/2013 | Krendelev et al. |
| 2013/0339751 A1 | 12/2013 | Sun et al. |
| 2013/0346741 A1 | 12/2013 | Kim et al. |
| 2013/0346755 A1 | 12/2013 | Nguyen et al. |
| 2014/0189811 A1 | 7/2014 | Taylor et al. |
| 2014/0233727 A1 | 8/2014 | Rohloff et al. |
| 2014/0355756 A1 | 12/2014 | Iwamura et al. |
| 2015/0100785 A1 | 4/2015 | Joye et al. |
| 2015/0100794 A1 | 4/2015 | Joye et al. |
| 2015/0205967 A1 | 7/2015 | Naedele et al. |
| 2015/0215123 A1 | 7/2015 | Kipnis et al. |
| 2015/0227930 A1 | 8/2015 | Quigley et al. |
| 2015/0229480 A1 | 8/2015 | Joye et al. |
| 2015/0244517 A1 | 8/2015 | Nita |
| 2015/0248458 A1 | 9/2015 | Sakamoto |
| 2015/0304736 A1 | 10/2015 | Lal et al. |
| 2015/0358152 A1 | 12/2015 | Ikarashi et al. |
| 2016/0004874 A1 | 1/2016 | Ioannidis et al. |
| 2016/0072623 A1 | 3/2016 | Joye et al. |
| 2016/0105402 A1 | 4/2016 | Kupwade-Patil et al. |
| 2016/0105414 A1 | 4/2016 | Bringer et al. |
| 2016/0119346 A1 | 4/2016 | Chen et al. |
| 2016/0140348 A1 | 5/2016 | Nawaz et al. |
| 2016/0179945 A1 | 6/2016 | Lastra Diaz et al. |
| 2016/0182222 A1* | 6/2016 | Rane ............... H04L 9/008 713/168 |
| 2016/0323098 A1 | 11/2016 | Bathen |
| 2016/0335450 A1 | 11/2016 | Yoshino et al. |
| 2016/0344557 A1 | 11/2016 | Chabanne et al. |
| 2016/0350648 A1 | 12/2016 | Gilad-Bachrach et al. |
| 2017/0070340 A1 | 3/2017 | Hibshoosh et al. |
| 2017/0070351 A1 | 3/2017 | Yan |
| 2017/0099133 A1 | 4/2017 | Gu et al. |
| 2017/0134158 A1* | 5/2017 | Pasol ............... H04L 9/00 |
| 2017/0185776 A1 | 6/2017 | Robinson et al. |
| 2017/0264426 A1 | 9/2017 | Joye et al. |
| 2018/0091466 A1 | 3/2018 | Friedman et al. |
| 2018/0139054 A1* | 5/2018 | Chu ............... H04L 9/3247 |
| 2018/0198601 A1 | 7/2018 | Laine et al. |
| 2018/0204284 A1 | 7/2018 | Cerezo Sanchez |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212754 A1 | 7/2018 | Williams et al. |
| 2018/0212755 A1 | 7/2018 | Williams et al. |
| 2018/0212756 A1 | 7/2018 | Carr |
| 2018/0212757 A1 | 7/2018 | Carr |
| 2018/0212759 A1 | 7/2018 | Williams et al. |
| 2018/0212775 A1 | 7/2018 | Williams |
| 2018/0212933 A1 | 7/2018 | Williams |
| 2018/0224882 A1 | 8/2018 | Carr |
| 2018/0234254 A1 | 8/2018 | Camenisch et al. |
| 2018/0267981 A1 | 9/2018 | Sirdey et al. |
| 2018/0270046 A1 | 9/2018 | Carr |
| 2018/0276417 A1 | 9/2018 | Cerezo Sanchez |
| 2018/0343109 A1 | 11/2018 | Koseki et al. |
| 2018/0359097 A1 | 12/2018 | Lindell |
| 2018/0373882 A1 | 12/2018 | Veugen |
| 2019/0013950 A1 | 1/2019 | Becker et al. |
| 2019/0042786 A1 | 2/2019 | Williams et al. |
| 2019/0108350 A1 | 4/2019 | Bohli et al. |
| 2019/0158272 A1 | 5/2019 | Chopra et al. |
| 2019/0229887 A1 | 7/2019 | Ding et al. |
| 2019/0238311 A1 | 8/2019 | Zheng |
| 2019/0251553 A1 | 8/2019 | Ma et al. |
| 2019/0251554 A1 | 8/2019 | Ma et al. |
| 2019/0253235 A1 | 8/2019 | Zhang et al. |
| 2019/0260585 A1 | 8/2019 | Kawai et al. |
| 2019/0280880 A1 | 9/2019 | Zhang et al. |
| 2019/0312728 A1 | 10/2019 | Poeppelmann |
| 2019/0327078 A1 | 10/2019 | Zhang et al. |
| 2019/0334716 A1 | 10/2019 | Koosis et al. |
| 2019/0349191 A1 | 11/2019 | Soriente et al. |
| 2019/0371106 A1 | 12/2019 | Kaye |
| 2020/0134200 A1 | 4/2020 | Williams et al. |
| 2020/0150930 A1 | 5/2020 | Carr et al. |
| 2020/0204341 A1 | 6/2020 | Williams et al. |

FOREIGN PATENT DOCUMENTS

| | | | |
|---|---|---|---|
| JP | 5680007 B2 | 3/2015 | |
| KR | 20127025089 A * | 2/2011 | ............... H04L 9/08 |
| KR | 101386294 B1 | 4/2014 | |
| WO | WO2014105160 A1 | 7/2014 | |
| WO | WO2015094261 A1 | 6/2015 | |
| WO | WO2016003833 A1 | 1/2016 | |
| WO | WO2016018502 A1 | 2/2016 | |
| WO | WO2018091084 A1 | 5/2018 | |
| WO | WO2018136801 A1 | 7/2018 | |
| WO | WO2018136804 A1 | 7/2018 | |
| WO | WO2018136811 A1 | 7/2018 | |

OTHER PUBLICATIONS

"International Search Report" and "Written Opinion of the International Searching Authority," Patent Cooperation Treaty Application No. PCT/US2018/014530, dated Apr. 23, 2018, 7 pages.

"International Search Report" and "Written Opinion of the International Searching Authority," Patent Cooperation Treaty Application No. PCT/US2018/014551, dated Apr. 24, 2018, 8 pages.

Petition to Insitute Derivation Proceeding Pursuant to 35 USC 135; Case No. DER2019-00009, US Patent and Trademark Office Patent Trial and Appeal Board; Jul. 26, 2019, 272 pages. (2 PDFs).

SCAMP Working Paper L29/11, "A WOODS HOLE Proposal Using Striping," Dec. 2011, 14 pages.

O'Hara, Michael James, "Shovel-ready Private Information Retrieval," Dec. 2015, 4 pages.

Carr, Benjamin et al., "Proposed Laughing Owl," NSA Technical Report, Jan. 5, 2016, 18 pages.

Carr, Benjamin et al., "A Private Stream Search Technique," NSA Technical Report, Dec. 1, 2015, 18 pages.

Drucker et al., "Paillier-encrypted databases with fast aggregated queries," 2017 14th IEEE Annual Consumer Communications & Networking Conference (CCNC), Jan. 8-11, 2017, pp. 848-853.

Tu et al., "Processing Analytical Queries over Encrypted Data," Proceedings of the VLDB Endowment, vol. 6, Issue No. 5, Mar. 13, 2013. pp. 289-300.

Boneh et al., "Private Database Queries Using Somewhat Homomorphic Encryption", Cryptology ePrint Archive: Report 2013/422, Standford University [online], Jun. 27, 2013, [retrieved on Dec. 9, 2019], 22 pages.

Chen et al., "Efficient Multi-Key Homomorphic Encryption with Packed Ciphertexts with Application to Oblivious Neural Network Inference", CCS '19 Proceedings of the 2019 ACM SIGSAC Conference on Computer and Communications Security, May 19, 2019. pp. 395-412.

Armknecht et al., "A Guide to Fully Homomorphic Encryption" IACR Cryptology ePrint Archive: Report 2015/1192 [online], Dec. 14, 2015, 35 pages.

Bayar et al., "A Deep Learning Approach to Universal Image Manipulation Detection Using a New Convolutional Layer", IH&MMSec 2016, Jun. 20-22, 2016. pp. 5-10.

Juvekar et al. "GAZELLE: A Low Latency Framework for Secure Neural Network Inference", 27th USENIX Security Symposium, Aug. 15-17, 2018. pp. 1650-1668.

Bösch et al., "SOFIR: Securely Outsourced Forensic Recognition," 2014 IEEE International Conference on Acoustic, Speech and Signal Processing (ICASSP), IEEE 978-1-4799-2893-4/14, 2014, pp. 2713-2717.

Waziri et al., "Big Data Analytics and Data Security in the Cloud via Fullly Homomorphic Encryption," World Academy of Science, Engineering and Technology International Journal of Computer, Electrical, Automation, Control and Information Engineering, vol. 9, No. 3, 2015, pp. 744-753.

(56) References Cited

OTHER PUBLICATIONS

Bajpai et al., "A Fully Homomorphic Encryption Implementation on Cloud Computing," International Journal of Information & Computation Technology, ISSN 0974-2239 vol. 4, No. 8, 2014, pp. 811-816.
Viejo et al., "Asymmetric homomorphisms for secure aggregation in heterogeneous scenarios," Information Fusion 13, Elsevier B.V., Mar. 21, 2011, pp. 285-295.
Patil et al, "Big Data Privacy Using Fully Homomorphic Non-Deterministic Encryption," IEEE 7th International Advance Computing Conference, Jan. 5-7, 2017, 15 pages.
Williams, Ellison Anne et al., "Wideskies: Scalable Private Information Retrieval," Jun. 8, 2016, 14 pages.
Panda et al., "FPGA Prototype of Low Latency BBS PRNG," IEEE International Symposium on Nanoelectronic and Systems, Dec. 2015, pp. 118-123, 7 pages.
Sahu et al., "Implementation of Modular Multiplication for RSA Algorithm," 2011 International Conference on Communication Systems and Network Technologies, 2011, pp. 112-114, 3 pages.

\* cited by examiner

SECURE PROBABILISTIC ANALYTICS USING AN ENCRYPTED ANALYTICS MATRIX

CROSS-REFERENCE TO RELATED APPLICATIONS

This application claims the benefit and priority of U.S. Provisional Application Ser. No. 62/448,890, filed on Jan. 20, 2017; U.S. Provisional Application Ser. No. 62/448,918, filed on Jan. 20, 2017; U.S. Provisional Application Ser. No. 62/448,893, filed on Jan. 20, 2017; U.S. Provisional Application Ser. No. 62/448,906, filed on Jan. 20, 2017; U.S. Provisional Application Ser. No. 62/448,908, filed on Jan. 20, 2017; U.S. Provisional Application Ser. No. 62/448,913, filed on Jan. 20, 2017; U.S. Provisional Application Ser. No. 62/448,916, filed on Jan. 20, 2017; U.S. Provisional Application Ser. No. 62/448,883, filed on Jan. 20, 2017; U.S. Provisional Application 62/448,885, filed on Jan. 20, 2017; U.S. Provisional Application Ser. No. 62/448,902, filed on Jan. 20, 2017; U.S. Provisional Application Ser. No. 62/448,896, filed on Jan. 20, 2017; U.S. Provisional Application Ser. No. 62/448,899, filed on Jan. 20, 2017; and U.S. Provisional Application Ser. No. 62/462,818, filed on Feb. 23, 2017, all of which are hereby incorporated by reference herein, including all references and appendices, for all purposes.

TECHNICAL FIELD

This disclosure relates to the technical field of encryption and decryption of data. More specifically, this disclosure relates to systems and methods for performing secure probabilistic analytics using an encrypted analytics matrix.

BACKGROUND

With development of computer technologies, many sensitive data, such as financial information and medical records can be kept on remote servers or cloud-based computing resources. Authorized users can access the sensitive data using applications running, for example, on their personal computing devices. Typically, personal computing devices are connected, via data networks, to servers or cloud-based computing resources. Therefore, the sensitive data can be subject to unauthorized access.

Encryption techniques, such as a homomorphic encryption, can be applied to the sensitive data to prevent unauthorized access. The encryption techniques can be used to protect "data in use", "data in rest", and "data in transit". A homomorphic encryption is a form of encryption in which a specific algebraic operation (generally referred to as addition or multiplication) performed on plaintext, is equivalent to another operation performed on ciphertext. For example, in Partially Homomorphic Encryption (PHE) schemes, multiplication in ciphertext is equal to addition of the same values in plaintext.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to the technology for secure data processing. Some embodiments of the present disclosure may facilitate a secure transmission of analytics from a client device to remote computing resource(s) for performing analytics over a data source and secure transmission of results of analytics from the computing resources back to the client device.

According to one example embodiment of the present disclosure, a method for performing secure probabilistic analytics using an encrypted analytics matrix is provided. The method may include receiving, by at least one server from a client, at least one analytic matrix, a term generation function, and a keyed hash function. The at least one analytic matrix can be encrypted using a homomorphic encryption scheme. The homomorphic encryption scheme may include a public key for encryption and a private key for decryption. The method may further include extracting, by the at least one server, a set of term components from a data set using the term generation function and the keyed hashed function. The method may include evaluating, by the at least one server, the at least one analytic matrix over the set of term components to obtain at least one encrypted result. The method may further include estimating, by the at least one server, a probabilistic error bound of the at least one encrypted result. The method may further include sending, by the at least one server, the at least one encrypted result and the probabilistic error bound to the client. The client can be configured to decrypt the at least one encrypted result using the homomorphic encryption scheme.

In some embodiments, the homomorphic encryption scheme includes a partially homomorphic encryption scheme. The partially homomorphic encryption scheme may include at least one of a Rivest, Shamir and Adleman cryptosystem, Elgamal cryptosystem, Benaloh cryptosystem, Goldwasser-Micali cryptosystem, and Pallier cryptosystem. In certain embodiments, the homomorphic encryption scheme may include a fully homomorphic encryption scheme.

In some embodiments, the at least one analytic matrix can be generated based on an analytic and at least one parameter associated with the analytic. In certain embodiments, the generation of the at least one analytic matrix may include extracting, using the term generation function, a set of term elements from the analytic and the at least one analytic parameter. The generation of the at least one analytic matrix may further include generating, using the keyed hash function, the set of hashes from the set of term elements. The generation of the at least one analytic matrix may further include partitioning elements of the set of hashes to generate a set of vectors, wherein each of the vectors is of a pre-defined dimension. The generation of the at least one analytic matrix may further include determining whether for at least one matrix element associated with row j and column m of the at least one analytic matrix, there is a vector C from the set of the vectors such that C[j]=m. If the result of the determination is positive, the at least one matrix element can be assigned a non-zero value. If the result of determination is negative, the at least one matrix element can be assigned a zero value. In some embodiments, the non-zero value can include an encrypted value of a non-zero bitmask of a term element selected from the set of term elements, wherein the hash of the term element is used to generate the vector C. The encrypted value can be obtained using the homomorphic encryption scheme.

In some embodiments, a number of rows of the at least one analytic matrix can be equal or greater than the number of elements in the set of term elements and length of the elements in the set of hashes can be divisible by a number of columns of the at least one analytical matrix.

In certain embodiments, estimating the probabilistic error is based on a hash collision rate of the hash function over the data set.

In some embodiments, the data set is one of a plaintext form, deterministically encrypted or semantically encrypted.

According to one example embodiment of the present disclosure, a system for performing secure probabilistic analytics using an encrypted analytics matrix is provided. The system may include at least one processor and a memory storing processor-executable codes, wherein the at least one processor can be configured to implement the operations of the above-mentioned method for performing secure probabilistic analytics using an encrypted analytics matrix.

According to yet another example embodiment of the present disclosure, the operations of the above-mentioned method for performing secure probabilistic analytics using a homomorphic encryption are stored on a machine-readable medium comprising instructions, which when implemented by one or more processors perform the recited operations.

Other example embodiments of the disclosure and aspects will become apparent from the following description taken in conjunction with the following drawings.

BRIEF DESCRIPTION OF DRAWINGS

Exemplary embodiments are illustrated by way of example and not limitation in the figures of the accompanying drawings, in which like references indicate similar elements.

DETAILED DESCRIPTION OF EXEMPLARY EMBODIMENTS

Figure 1:
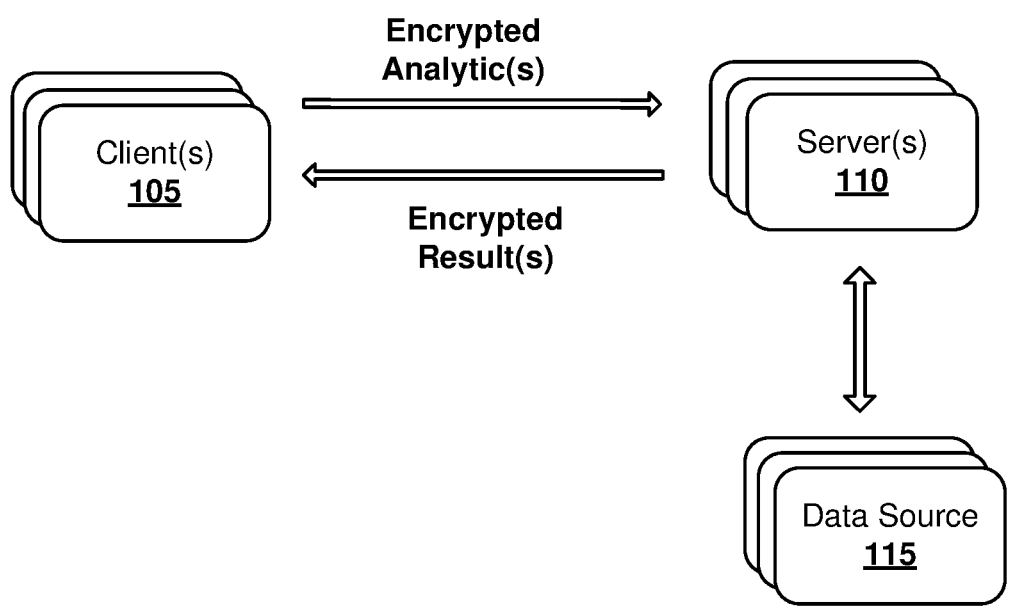
FIG. 1 is a block diagram of an example environment suitable for practicing methods for secure probabilistic analytics using an encrypted analytics matrix as described herein.

The technology disclosed herein is concerned with methods and systems for performing secure probabilistic analytics over data source using a homomorphic encryption. Embodiments of the present disclosure may facilitate a secure transmission of analytics from a client device to computing resource(s) providing a target data source and secure transmission of results of analytics from the computing resource(s) back to the client device.

Some embodiments of the present disclosure may be used to encrypt an analytic on a client device using an encrypted analytics matrix. The encrypted analytics matrix can be sent to computing resource(s) providing desired data source(s). The encrypted analytics matrix can be performed over desired data source(s) to produce encrypted results. The encrypted results can be returned to the client device and decrypted using the homomorphic encryption techniques. Embodiments of the present disclosure may allow performing of an analytic over desired data sources in a secure and private manner because neither content of the analytic nor results of the analytic are revealed to a data owner, observer, or attacker.

According to one example embodiment of the present disclosure, a method for performing secure probabilistic analytics using an encrypted analytics matrix commences with receiving, by at least one server from a client, at least one analytic matrix. The at least one analytic matrix can be encrypted using a homomorphic encryption scheme. The homomorphic encryption scheme may include a public key for encryption and a private key for decryption. The method may further include extracting, by the at least one server and based on the homomorphic encryption scheme, a set of terms from a data set. The method may further include evaluating, by the at least one server, the at least one analytic matrix over the set of terms to obtain at least one encrypted result. The method may further include estimating, by the at least one server, a probabilistic error bound of the at least one encrypted result. The method may further include sending, by the at least one server, the at least one encrypted result and the probabilistic error bound to the client. The client can be configured to decrypt the at least one encrypted result using the homomorphic encryption scheme.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 shows a block diagram of an example environment 100 suitable for practicing the methods described herein. It should be noted, however, that the environment 100 is just one example and is a simplified embodiment provided for illustrative purposes, and reasonable deviations of this embodiment are possible as will be evident for those skilled in the art.

As shown in FIG. 1, the environment 100 may include at least one client device(s) 105 (also referred to as client(s) 105) and at least one server 110. The client(s) 105 can include any appropriate computing device having network functionalities allowing the device to communicate to server(s) 110. In some embodiments, the client(s) 105 can be connected to the server(s) 110 via one or more wired or wireless communications networks. In various embodiments, the client(s) 105 includes, but is not limited to, a computer (e.g., laptop computer, tablet computer, desktop computer), a server, cellular phone, smart phone, gaming console, multimedia system, smart television device, set-top box, infotainment system, in-vehicle computing device, informational kiosk, smart home computer, software application, computer operating system, modem, router, and so forth. In some embodiments, the client(s) 105 can be used by users for Internet browsing purposes.

In some embodiments, the server(s) 110 may be configured to store or provide access to at least one data source(s) 115. In certain embodiments, the server(s) 110 may include a standalone computing device. In various embodiments, the data source(s) 115 may be located on a single server 110 or distributed over multiple server(s) 110. The data source 115 may include plaintext data, deterministically encrypted data, semantically encrypted data, or a combination of thereof.

In some embodiments, the server(s) 110 may be implemented as cloud-based computing resource shared by multiple users. The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

In various embodiments, the client(s) 105 can make certain client inquires within the environment 100. For example, the client(s) 105 may be configured to send analytics to the server 110 to be performed over the data source(s) 115. The server 110 can be configured to perform the analytics over the data source(s) 115 and return the results of analytics to the client(s) 105.

To protect the content of the analytics, the client(s) 105 can be configured to encrypt the analytics to a homomorphic analytics matrix based on a homomorphic encryption scheme. The homomorphic encryption scheme can include a partially homomorphic encryption scheme or a fully homomorphic encryption scheme. The partially homomorphic encryption scheme can include one of a Rivest, Shamir and Adleman cryptosystem, Elgamal cryptosystem, Benaloh cryptosystem, Goldwasser-Micali cryptosystem, and Pallier cryptosystem. The analytics can be encrypted with use of a public (encryption) key of the homomorphic encryption scheme. The homomorphic analytic matrix and the public key can be sent to the server 110. The homomorphic analytic matrix can be only decrypted with a private (decryption) key of the homomorphic encryption scheme. The decryption key can be kept on the client(s) 105 and never provided to the server(s) 110.

To protect the content of the results of the analytic, the server(s) 110 can be configured to evaluate the encrypted analytics matrix over the data source using the same homographic encryption scheme and the public key received from the client 105 and, thereby, obtain encrypted results of the analytics. The encrypted results can be sent to the client(s) 105. The client(s) 105 can decrypt the encrypted results using the private key. Because the private key is always kept on the client(s) 105, neither homomorphic analytic matrix nor encrypted results of the analytic can be decrypted on the server(s) 110 or when intercepted while in transition between the client(s) 105 and the server(s) 110.

Figure 2:
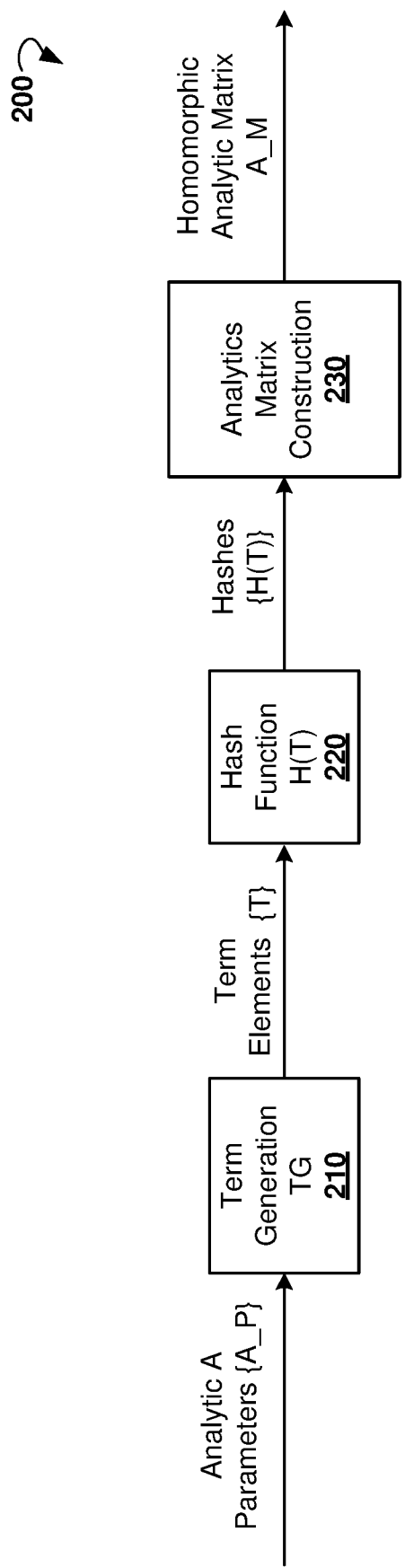
FIG. 2 is a block diagram showing details of an encrypted analytics matrix, according to an example embodiment.

FIG. 2 is a block diagram 200 showing details of homomorphic encryption scheme 200, according to some example embodiments. The modules of the scheme 200 can be implemented as software instructions stored in memory of the client 105 and executed by at least one processor of the client 105. The client 105 may be configured to acquire a desired analytic A to be executed over data source 115. The analytic A can be associated with analytic parameter set $\{A\_P\}$. The analytic A and analytic parameter set $\{A\_P\}$ can be further encrypted into a homomorphic analytic matrix A_M using homomorphic encryption E.

The scheme 200 may include a term generation (TG) function 210. The term generation function 210 can be used to extract a set of term elements $\{T\}$ of analytic A. For, example, if analytic A is a database frequency distribution analytic for elements in <row:column> pairs, then the set $\{T\}$ reflects the frequency distribution of these elements from the database.

The scheme 200 may further include a keyed hash function H(T) 220. The hash function H(T) can be used to obtain a set of hashes H(T)={H(T): T in $\{T\}$}. The set of hashes H(T) denotes the range of the hash function H(T) over the set of term elements $\{T\}$. The keyed hash function H(T) can be associated with a public key used for the encryption. The number of distinct elements in the set H(T) is equal to the number of distinct elements in the set of term elements $\{T\}$.

The scheme 200 may further include an analytics matrix construction module 230. The module 230 can be used to construct a homomorphic analytic matrix A_M for the analytic A associated with an analytic parameter set $\{A\_P\}$. The desired dimensions s×d of the matrix A_M can be selected to satisfy the following conditions: number of row s be equal or greater than the number of distinct elements in the set of term elements $\{T\}$, s be equal or greater than d, and |H(T)| be divisible by d.

The module 230 can be configured to partition each of hashes H(T) into a vector $C\_t$ of d-many bitwise components $c\_T[j]$, i=0, ... d−1. C(H(T)) denotes a set of vectors obtained as result of partition of hashes in set $\{H(T)\}$. It should be noted that $|\{(C(H(T))\}|=|\{H(T)\}|=|\{T\}|$. For example, if d=3 and H(T)=000001001111, then vector $c\_T=\{c\_T[0], c\_T[1], c\_T[2]\}$ where $c\_T[0]$=0000, $c\_T[0]$=0100, and $c\_T[2]$=1111.

The module 230 can be further configured to determine whether $c\_T[d-1]$ is distinct for all elements in $\{H(T)\}$. If the result of the determination is negative the module 230 can select a different keyed hash function H and reconstruct $\{H(T)\}$ and C(H(T)) before constructing the homographic analytic matrix A_M.

Elements A_M (j,m), wherein j=0, ... , (d−1) and m=0, ... , (s−1) can be determined as follows. If there is an element $c\_T[j]$ in set of vectors $\{C(H(T))\}$ such that $c\_T[j]$=m, then A_M(j,m) is set to E(B_j,m) where B_j,m is a nonzero bit mask corresponding to the term element T, otherwise, A_M (j,m) is set to E(0), wherein E is the homographic encryption. In this manner, the homomorphic analytic matrix A_M includes encryptions of nonzero bit-masks for only the term elements present in the set $\{T\}$. The analytic A cannot be recovered from the homomorphic analytical matrix A_M without a private key associated with homomorphic encryption scheme E.

The client 105 can be further configured to send the homomorphic analytic matrix A_M, the term generation function TG, and the hash function H(T) with the public key to the server(s) 110.

In some embodiments, the server(s) 110 can be configured to extract a set of term elements $\{T\}$ from the data source 115 using the term generation function TG and TG and the keyed hash function H(T). The server(s) 110 can be further configured to evaluate the homomorphic analytic matrix A_M over the set of term elements $\{T\}$ to produce encrypted results E(R). The server(s) 110 can be further configured to estimate a probabilistic error bound b of the encrypted results E(R) based on a hash collision rate of the hash function H(T) over data source 115. The server(s) 110 can be further configured to send the encrypted results E(R) and the probabilistic error bound b to the client 105.

The client 105 can be further configured to decrypt the encrypted results E(R) in order to obtain the results R using the private key of the homomorphic encryption scheme E.

Figure 3:
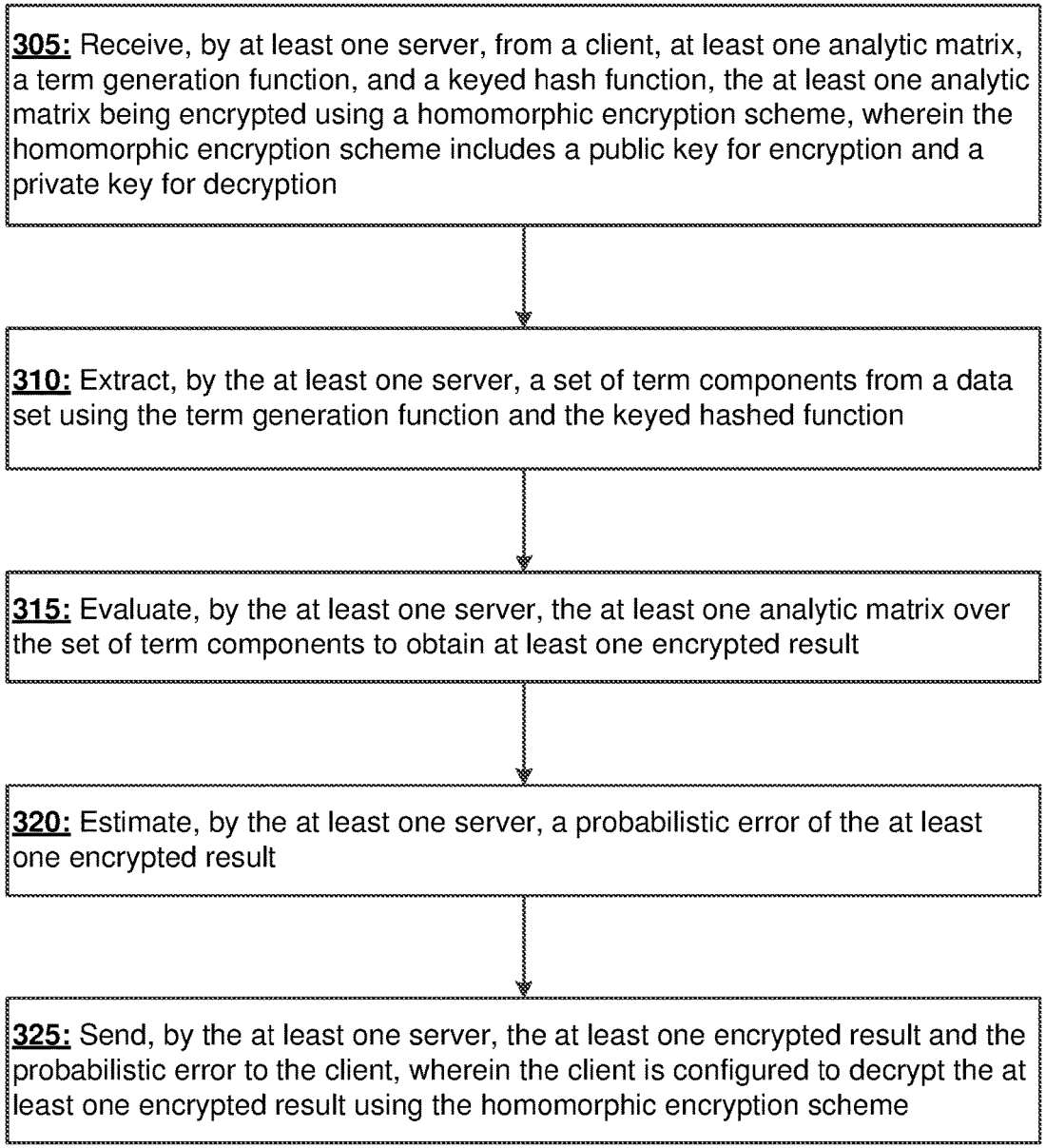
FIG. 3 is a flow chart of an example method for performing secure probabilistic analytics using an encrypted analytics matrix.

FIG. 3 is a flow chart of an example method 300 for performing secure probabilistic analytics using a homomorphic analytic matrix, according to some example embodiments. The method 300 may be performed within environment 100 illustrated in FIG. 1. Notably, the steps recited below may be implemented in an order different than described and shown in the FIG. 3. Moreover, the method 300 may have additional steps not shown herein, but which can be evident to those skilled in the art from the present disclosure. The method 300 may also have fewer steps than outlined below and shown in FIG. 3.

The method 300 may commence, in block 305, with receiving, by at least one server, from a client, at least one analytic matrix, a term generation function, and a keyed hash function. The at least one analytic matrix can be encrypted using the homomorphic encryption scheme. The homomorphic encryption scheme may include a public key for encryption and a private key for decryption.

In block 310, the method 300 may proceed with extracting, by the at least one server, a set of term components from a data set using the term generation function and the keyed hashed function.

In block 315, the method 300 may evaluate, by the at least one server, the at least one analytic matrix over the set of term components to obtain at least one encrypted result.

In block 320, the method 300 may proceed with estimating, by the at least one server, a probabilistic error of the at least one encrypted result. The estimate can be based on hash collision of the keyed hash function over the data set.

In block 325, the method may include sending, by the at least one server, the at least one encrypted result and the probabilistic error to the client. The client can be configured to decrypt the at least one encrypted result using the homomorphic encryption scheme.

Figure 4:
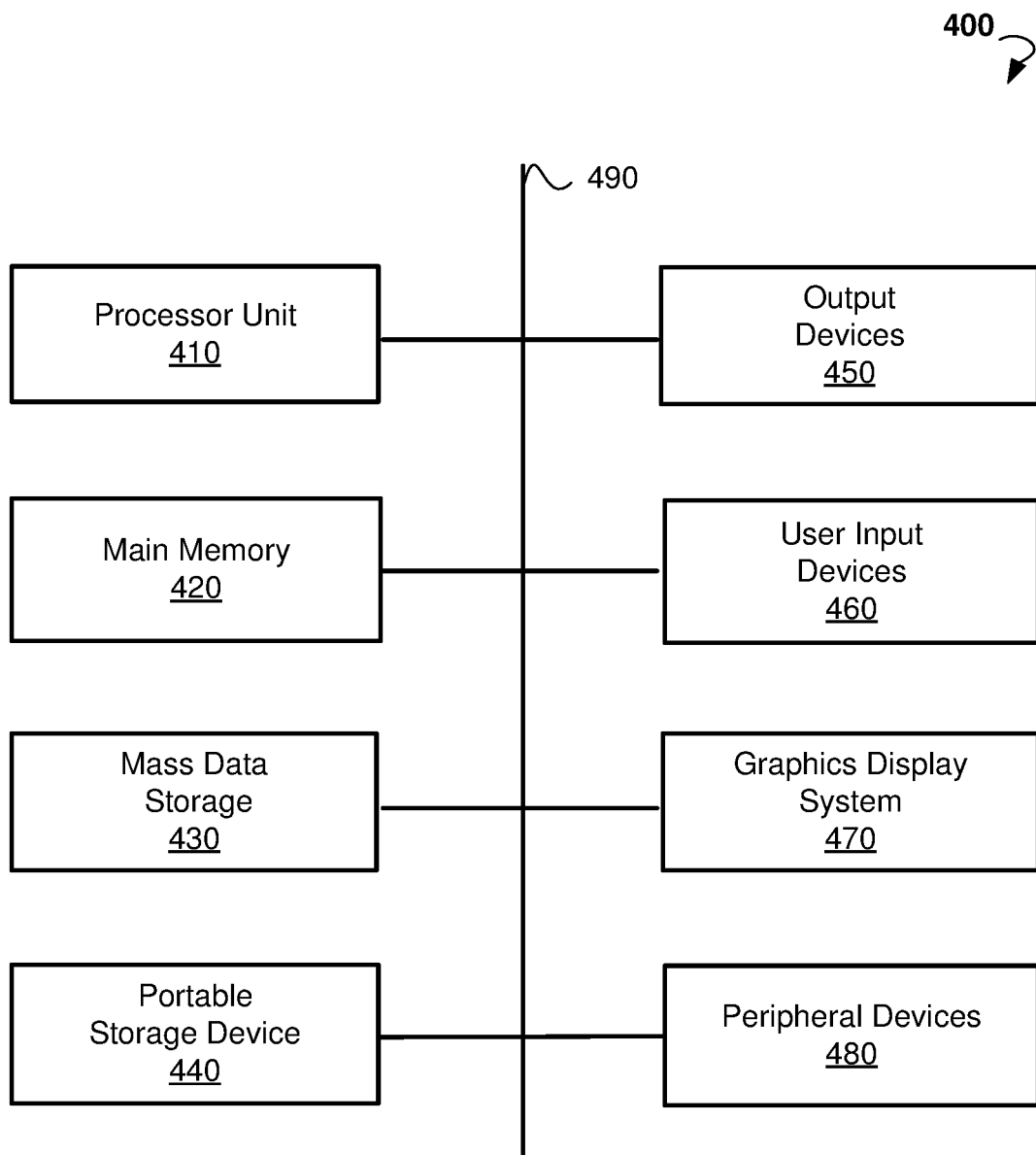
FIG. 4 is a computer system that can be used to implement some embodiments of the present disclosure.

FIG. 4 illustrates an exemplary computer system 400 that may be used to implement some embodiments of the present disclosure. The computer system 400 of FIG. 4 may be implemented in the contexts of the likes of the client 105, the server(s) 110, and the data source 115. The computer system 400 of FIG. 4 includes one or more processor units 410 and main memory 420. Main memory 420 stores, in part, instructions and data for execution by processor units 410. Main memory 420 stores the executable code when in operation, in this example. The computer system 400 of FIG. 4 further includes a mass data storage 430, portable storage device 440, output devices 450, user input devices 460, a graphics display system 470, and peripheral devices 480.

The components shown in FIG. 4 are depicted as being connected via a single bus 490. The components may be connected through one or more data transport means. Processor unit 410 and main memory 420 is connected via a local microprocessor bus, and the mass data storage 430, peripheral device(s) 480, portable storage device 440, and graphics display system 470 are connected via one or more input/output (I/O) buses.

Mass data storage 430, which can be implemented with a magnetic disk drive, solid state drive, or an optical disk drive, is a non-volatile storage device for storing data and instructions for use by processor unit 410. Mass data storage 430 stores the system software for implementing embodiments of the present disclosure for purposes of loading that software into main memory 420.

Portable storage device 440 operates in conjunction with a portable non-volatile storage medium, such as a flash drive, floppy disk, compact disk, digital video disc, or Universal Serial Bus (USB) storage device, to input and output data and code to and from the computer system 400 of FIG. 4. The system software for implementing embodiments of the present disclosure is stored on such a portable medium and input to the computer system 400 via the portable storage device 440.

User input devices 460 can provide a portion of a user interface. User input devices 460 may include one or more microphones, an alphanumeric keypad, such as a keyboard, for inputting alphanumeric and other information, or a pointing device, such as a mouse, a trackball, stylus, or cursor direction keys. User input devices 460 can also include a touchscreen. Additionally, the computer system 400 as shown in FIG. 4 includes output devices 450. Suitable output devices 450 include speakers, printers, network interfaces, and monitors.

Graphics display system 470 include a liquid crystal display (LCD) or other suitable display device. Graphics display system 470 is configurable to receive textual and graphical information and processes the information for output to the display device.

Peripheral devices 480 may include any type of computer support device to add additional functionality to the computer system.

The components provided in the computer system 400 of FIG. 4 are those typically found in computer systems that may be suitable for use with embodiments of the present disclosure and are intended to represent a broad category of such computer components that are well known in the art. Thus, the computer system 400 of FIG. 4 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, TIZEN, and other suitable operating systems.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

The present technology is described above with reference to example embodiments. Therefore, other variations upon the example embodiments are intended to be covered by the present disclosure.

What is claimed is:

1. A method for performing a secure probabilistic analysis, the method comprising:
  receiving, by at least one server from a client, at least one analytic matrix, a term generation function, and a keyed hash function, the at least one analytic matrix being generated from an analytic and an analytic parameter set and encoded using a homomorphic encryption scheme, the at least one analytic matrix having dimensions comprising a number of rows that are equal to or greater than a number of distinct elements in a set of term components, wherein the homomorphic encryption scheme includes a public key for encryption and a private key for decryption;

extracting, by the at least one server, the set of term components from a data set using the term generation function, the keyed hashed function, and the analytic;

evaluating, by the at least one server, the at least one analytic matrix over the encrypted data set to obtain at least one encrypted result;

estimating, by the at least one server, a probabilistic error bound of the at least one encrypted result; and sending, by the at least one server, the at least one encrypted result and the probabilistic error bound to the client, wherein the client is configured to decrypt the at least one encrypted result using the homomorphic encryption scheme.

2. The method of claim 1, wherein the homomorphic encryption scheme includes a partially homomorphic encryption scheme.

3. The method of claim 2, wherein the partially homomorphic encryption scheme includes at least one of a Rivest, Shamir and Adleman cryptosystem, an Elgamal cryptosystem, a Benaloh cryptosystem, a Goldwasser-Micali cryptosystem, and a Pallier cryptosystem.

4. The method of claim 1, wherein the homomorphic encryption scheme includes a fully homomorphic encryption scheme.

5. The method of claim 1, wherein the at least one analytic matrix is generated based on an analytic and at least one parameter associated with the analytic.

6. The method of claim 5, wherein the generation of the at least one analytic matrix includes:

extracting, using the term generation function, a set of term elements from the analytic and at least one analytic parameter;

generating, using the keyed hash function, a set of hashes from the set of term elements;

partitioning elements of the set of hashes to generate a set of vectors, wherein each of the vectors is of a predefined dimension;

determining whether for at least one matrix element associated with row j and column m of the at least one analytic matrix, there is a vector C from the set of vectors, wherein $C[j]=m$;

if the result of the determination is positive, assigning the at least one matrix element a non-zero value; and if the result of the determination is negative, assigning the at least one matrix element a zero value.

7. The method of claim 6, wherein the number of rows of the at least one analytic matrix is equal or greater than the number of distinct elements in the set of term elements and length of the elements in the set of hashes is divisible by a number of columns of the at least one analytical matrix.

8. The method of claim 6, wherein the non-zero value is an encrypted value of a non-zero bitmask of a term element of the set of term elements, wherein a hash of the term element is used to generate the vector C, the encrypted value being obtained using the homomorphic encryption scheme.

9. The method of claim 1, wherein estimating the probabilistic error is based on a hash collision rate of the keyed hash function over the data set.

10. The method of claim 1, wherein the data set is one of a plaintext form, deterministically encrypted or semantically encrypted.

11. A system for performing a secure probabilistic analysis using homomorphic encryption, the system comprising:

at least one processor; and a memory communicatively coupled with the at least one processor, the memory storing instructions, which when executed by the at least one processor causes the system to:

receive, from a client, at least one analytic matrix, a term generation function, and a keyed hash function, the at least one analytic matrix being generated from an analytic and an analytic parameter set and encoded using a homomorphic encryption scheme, the at least one analytic matrix having dimensions comprising a number of rows that are equal to or greater than a number of distinct elements in a set of term components, wherein the homomorphic encryption scheme includes a public key for encryption and a private key for decryption;

extract, by the at least one server, the set of term components from a data set using the term generation function, the keyed hashed function, and the analytic;

evaluate the at least one analytic matrix over the set of term components to obtain at least one encrypted result;

estimate a probabilistic error bound of the at least one encrypted result; and send the at least one encrypted result and the probabilistic error bound to the client, wherein the client is configured to decrypt the at least one encrypted result using the homomorphic encryption scheme.

12. The system of claim 11, wherein the homomorphic encryption scheme includes a partially homomorphic encryption scheme.

13. The system of claim 12, wherein the partially homomorphic encryption scheme includes at least one of a Rivest, Shamir and Adleman cryptosystem, an Elgamal cryptosystem, a Benaloh cryptosystem, a Goldwasser-Micali cryptosystem, and a Pallier cryptosystem.

14. The system of claim 11, wherein the homomorphic encryption scheme includes a fully homomorphic encryption scheme.

15. The system of claim 11, wherein the at least one analytic matrix is generated based on an analytic and at least one parameter associated with the analytic.

16. The system of claim 15, wherein the generation of the at least one analytic matrix includes:

extracting, using the term generation function, a set of term elements from the analytic and at least one analytic parameter;

generating, using the keyed hash function, a set of hashes from the set of term elements;

partitioning elements of the set of hashes to generate a set of vectors, wherein each of the vectors is of a predefined dimension;

determining whether for at least one matrix element associated with row j and column m of the at least one analytic matrix, there is a vector C from the set of vectors, wherein $C[j]=m$;

if the result of the determination is positive, assigning the at least one matrix element a non-zero value; and if the result of determination is negative, assigning the at least one matrix element a zero.

17. The system of claim 16, wherein the number of rows of the at least one analytic matrix is equal or greater than the number of distinct elements in the set of term elements and length of the elements in the set of hashes is divisible by a number of columns of the at least one analytical matrix.

18. The system of claim 16, wherein the non-zero value is an encrypted value of a non-zero bitmask of a term element of the set of term elements, wherein a hash of the term element is used to generate the vector C, the encrypted value being obtained using the homomorphic encryption scheme.

19. The system of claim 13, wherein estimating the probabilistic error is based on a hash collision rate of the keyed hash function over the data set.

20. A non-transitory computer-readable storage medium having embodied thereon instructions, which when executed by at least one processor, perform steps of a method, the method comprising:

receiving, by at least one server from a client, at least one analytic matrix, a term generation function, and a keyed hash function, the at least one analytic matrix being generated from an analytic and an analytic parameter set and encoded using a homomorphic encryption scheme, the at least one analytic matrix having dimensions comprising a number of rows that are equal to or greater than a number of distinct elements in a set of term components, wherein the homomorphic encryption scheme includes a public key for encryption and a private key for decryption;

extracting, by the at least one server, a set of term components from a data set using the term generation function and the keyed hashed function;

evaluating, by the at least one server, the at least one analytic matrix over the set of term components to obtain at least one encrypted result;

estimating, by the at least one server, a probabilistic error bound of the at least one encrypted result; and sending, by the at least one server, the at least one encrypted result and the probabilistic error bound to the client, wherein the client is configured to decrypt the at least one encrypted result using the homomorphic encryption scheme.

* * * * *